US010824272B2

(12) United States Patent
Jang et al.

(10) Patent No.: US 10,824,272 B2
(45) Date of Patent: Nov. 3, 2020

(54) TOUCH CIRCUIT, TOUCH DRIVING CIRCUIT, TOUCH DISPLAY DEVICE, AND METHOD FOR DRIVING TOUCH CIRCUIT FOR REDUCING INITIALIZATION SPEED AND MINIMIZING LOSS OF TOUCH SENSING DATA DURING MALFUNCTION

(71) Applicant: LG DISPLAY CO., LTD., Seoul (KR)

(72) Inventors: HyunWoo Jang, Goyang-si (KR); SuWon Lee, Ansan-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/212,590

(22) Filed: Dec. 6, 2018

(65) Prior Publication Data

US 2019/0179484 A1 Jun. 13, 2019

(30) Foreign Application Priority Data

Dec. 8, 2017 (KR) .................. 10-2017-0167991

(51) Int. Cl.
*G06F 3/041* (2006.01)
*G06F 3/044* (2006.01)
(52) U.S. Cl.
CPC ............ *G06F 3/0418* (2013.01); *G06F 3/044* (2013.01); *G06F 3/0446* (2019.05); *G06F 3/04166* (2019.05); *G06F 3/0412* (2013.01)

(58) Field of Classification Search
CPC .. G06F 3/0412; G06F 3/04166; G06F 3/0418; G06F 3/044; G06F 3/0446
See application file for complete search history.

(56) References Cited

U.S. PATENT DOCUMENTS

| 2014/0204045 | A1* | 7/2014 | Komoto | G06F 3/044 345/173 |
| 2015/0062034 | A1* | 3/2015 | Kim | G06F 3/044 345/173 |
| 2018/0210608 | A1* | 7/2018 | Park | G06F 3/0418 |

* cited by examiner

*Primary Examiner* — Ram A Mistry
(74) *Attorney, Agent, or Firm* — Polsinelli PC

(57) ABSTRACT

A touch display device includes a touch panel on which a plurality of touch electrodes is disposed; and a touch circuit configured to output a touch driving signal of a pulse type to the touch panel and to sense occurrence of touch or a touch position according to a touch synchronization signal for defining a touch period, wherein the touch circuit is configured to receive the sensing data to sense occurrence of touch or a touch position and to determine whether the touch driver malfunctions, and to output a simplified initialization command to the touch driver when it is determined that the touch driver malfunctions, and the touch driver is initialized with a pre-stored set value maintained not changed upon receiving the simplified initialization command.

20 Claims, 14 Drawing Sheets

TOUCH CIRCUIT, TOUCH DRIVING CIRCUIT, TOUCH DISPLAY DEVICE, AND METHOD FOR DRIVING TOUCH CIRCUIT FOR REDUCING INITIALIZATION SPEED AND MINIMIZING LOSS OF TOUCH SENSING DATA DURING MALFUNCTION

CROSS REFERENCE TO RELATED APPLICATION

This application claims priority from Korean Patent Application No. 10-2017-0167991, filed on Dec. 8, 2017, which is hereby incorporated by reference in its entirety for all purposes as if fully set forth herein.

BACKGROUND

Field of the Disclosure

The present disclosure relates to a touch circuit, a touch driving circuit, a touch display device, and a method for driving the same.

Description of the Background

With the development of the information-oriented society, there is growing demand for display devices for displaying images in various forms, and accordingly, different types of display devices, such as liquid crystal display (LCD) devices, plasma display panels (PDP), and organic light-emitting display devices (OLED), have been used in recent years.

Among these various display devices, a touch display device is capable of providing a touch-based input mode that enables a user to easily, intuitively, and conveniently input information or commands, representing a departure from conventional input modes using buttons, a keyboard, and a mouse.

To provide the touch-based input mode, the touch display device needs to recognize whether a user performs a touch and to accurately detect the coordinates (position) of the touch.

To this end, a capacitive touch mode is frequently adopted, which detects the occurrence of a touch and the coordinates of the touch on the basis of a change in capacitance between touch electrodes or a change in capacitance between a touch electrode and a pointer, such as a finger, through a plurality of touch electrodes disposed on a touch panel (touch screen panel) as touch sensors.

In an electronic device having a touch sensing function, such as a touch display device, a touch circuit, which receives a touch sensing signal from a plurality of touch electrodes and generates touch sensing data, may malfunction due to electromagnetic interference (EMI) or noise.

SUMMARY

An aspect of the present disclosure is to provide a touch circuit, a touch driving circuit, a touch display device, and a method for driving the same which are capable of reducing initialization speed.

An aspect of the present disclosure is to provide a touch circuit, a touch driving circuit, a touch display device, and a method for driving the same which are capable of reducing initialization speed and thus minimizing the loss of touch sensing data even if a malfunction occurs.

An aspect of the present disclosure is to provide a touch circuit, a touch driving circuit, a touch display device, and a method for driving the same which are capable of recognizing continuous touch inputs without interruption.

An aspect of the present disclosure is to provide a touch circuit, a touch driving circuit, a touch display device, and a method for driving the same which are capable of preventing malfunctions when a clock signal is unstable in a mode switch.

In accordance with an aspect of aspects of the present disclosure, there may be provided a touch display device including: a touch panel on which a plurality of touch electrodes is disposed; and a touch circuit configured to output a touch driving signal of a pulse type to the touch panel and to sense occurrence of a touch or a touch position according to a touch synchronization signal for defining a touch period for touch sensing.

The touch circuit may include: a touch driver configured to supply the touch driving signal to one or more of the plurality of touch electrodes to drive the touch electrodes in the touch period and to obtain sensing data by signal-processing a touch sensing signal detected from the driven touch electrodes; and a touch controller configured to receive the sensing data to sense occurrence of a touch or a touch position and to determine whether the touch driver malfunctions, and to output a simplified initialization command to the touch driver when it is determined that the touch driver malfunctions.

The touch driver may be initialized with a pre-stored set value maintained not changed upon receiving the simplified initialization command.

The touch controller may generate and output a touch driving generation signal for generating the touch driving signal in the touch period, and may toggle the touch driving generation signal a preset number of times to output the touch driving generation signal as the simplified initialization command in a period other than the touch period when it is determined that the touch driver malfunctions.

The touch driver may include: a driving sensor configured to receive the touch driving signal and to supply the touch driving signal to the one or more of the plurality of touch electrodes to thus drive the touch electrodes, and to obtain the sensing data by signal processing of the touch sensing signal detected from the driven touch electrodes; a timing generator configured to receive the touch synchronization signal and the touch driving generation signal and to control a timing for the driving sensor to drive a touch electrode according to a set value; a register configured to store the set value for driving the timing generator and the driving sensor; and a reset controller configured to output a simplified reset signal and to initialize the timing generator and the driving sensor upon receiving the simplified initialization command.

The driving sensor may include: a switch configured to receive the touch driving signal, to sequentially select the one or more of the plurality of touch electrodes, and to supply the touch driving signal to the one or more touch electrodes; a touch sensing signal detector configured to be electrically connected to the one or more touch electrodes supplied with the touch driving signal through the switch and to detect the touch sensing signal; a sensing data generator configured to convert the touch sensing signal into the sensing data, which is digital data; and a communicator configured to transmit the sensing data to the touch controller, to receive the set value from the touch controller, and to transmit the set value to the register.

The touch controller may output a reset signal to the touch driver when the touch circuit is driven.

The reset controller may transmit the reset signal to initialize the register and may output the simplified reset signal to the timing generator and the driving sensor when the reset signal is received.

The register may receive and store the set value from the touch controller through the communicator when initialized.

The touch controller may output the reset signal to the touch driver when it is determined again that the touch driver malfunctions after the simplified initialization command is output a preset number of times.

The touch controller may output the simplified initialization command to the touch driver after a preset time for which a clock signal is stabilized when the touch display device is switched from an idle mode to a normal mode.

The touch circuit may further include a touch driving signal generator configured to receive the touch driving generation signal from the touch controller in the touch period, to generate the touch driving signal according to the touch driving generation signal, and to output the touch driving signal to the touch driver.

In accordance with another aspect of aspects of the present disclosure, there may be provided a touch circuit including: a touch driver configured to supply a touch driving signal of a pulse type to one or more of a plurality of touch electrodes disposed on a touch panel to drive the touch electrodes in a touch period, according to a touch synchronization signal for defining the touch period for touch sensing, and to obtain sensing data by signal processing of a touch sensing signal detected from the driven touch electrodes; and a touch controller configured to receive the sensing data to sense occurrence of touch or a touch position and to determine whether the touch driver malfunctions, and to output a simplified initialization command to the touch driver when it is determined that the touch driver malfunctions.

The touch driver may include: a driving sensor configured to receive the touch driving signal and to supply the touch driving signal to the one or more of the plurality of touch electrodes to thus drive the touch electrodes, and to obtain the sensing data by signal processing of the touch sensing signal detected from the driven touch electrodes; a timing generator configured to receive the touch synchronization signal and a touch driving generation signal and to control a timing for the driving sensor to drive a touch electrode according to a set value; a register configured to store the set value for driving the driving sensor; and a reset controller configured to output a simplified reset signal and to initialize the timing generator and the driving sensor upon receiving the simplified initialization command.

In accordance with still another aspect of aspects of the present disclosure, there may be provided a method for driving a touch circuit including: determining, by a touch controller, whether a touch driver malfunctions by analyzing whether sensing data is received and whether the received sensing data has an abnormal value; outputting a simplified initialization command to the touch driver when it is determined that the touch driver malfunctions; and initializing, by a reset controller of the touch driver, a timing generator and a driving sensor other than a register that stores a set value for setting a time to operate the touch driver when the simplified initialization command is received.

In accordance with yet another aspect of aspects of the present disclosure, there may be provided a touch driving circuit including: a driving sensor configured to receive a touch driving signal and to supply the touch driving signal to one or more of a plurality of touch electrodes disposed on a touch panel to thus drive the touch electrodes, and to obtain a sensing data by signal processing of a touch sensing signal detected from the driven touch electrodes; a timing generator configured to receive a touch synchronization signal and a touch driving generation signal and to control a timing for the driving sensor to drive a touch electrode according to a set value; a register configured to store the set value for driving the driving sensor; and a reset controller configured to output a simplified reset signal and to initialize the timing generator and the driving sensor upon receiving a simplified initialization command from an external touch controller.

As described above, according to aspects of the present disclosure, it is possible to provide a touch circuit, a touch driving circuit, a touch display device, and a method for driving the same which are capable of reducing initialization speed.

According to aspects of the present disclosure, it is possible to provide a touch circuit, a touch driving circuit, a touch display device, and a method for driving the same which are capable of reducing initialization speed and thus minimizing the loss of touch sensing data even if a malfunction occurs.

According to aspects of the present disclosure, it is possible to provide a touch circuit, a touch driving circuit, a touch display device, and a method for driving the same which are capable of recognizing continuous touch inputs without interruption.

According to aspects of the present disclosure, it is possible to provide a touch circuit, a touch driving circuit, a touch display device, and a method for driving the same which are capable of preventing malfunctions when a clock signal is unstable in a mode switch.

According to the aspects of the present disclosure, a simplified initialization function is provided except in initialization of restoring a set value to reduce initialization speed, thereby minimizing the loss of touch sensing data even if a malfunction occurs.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
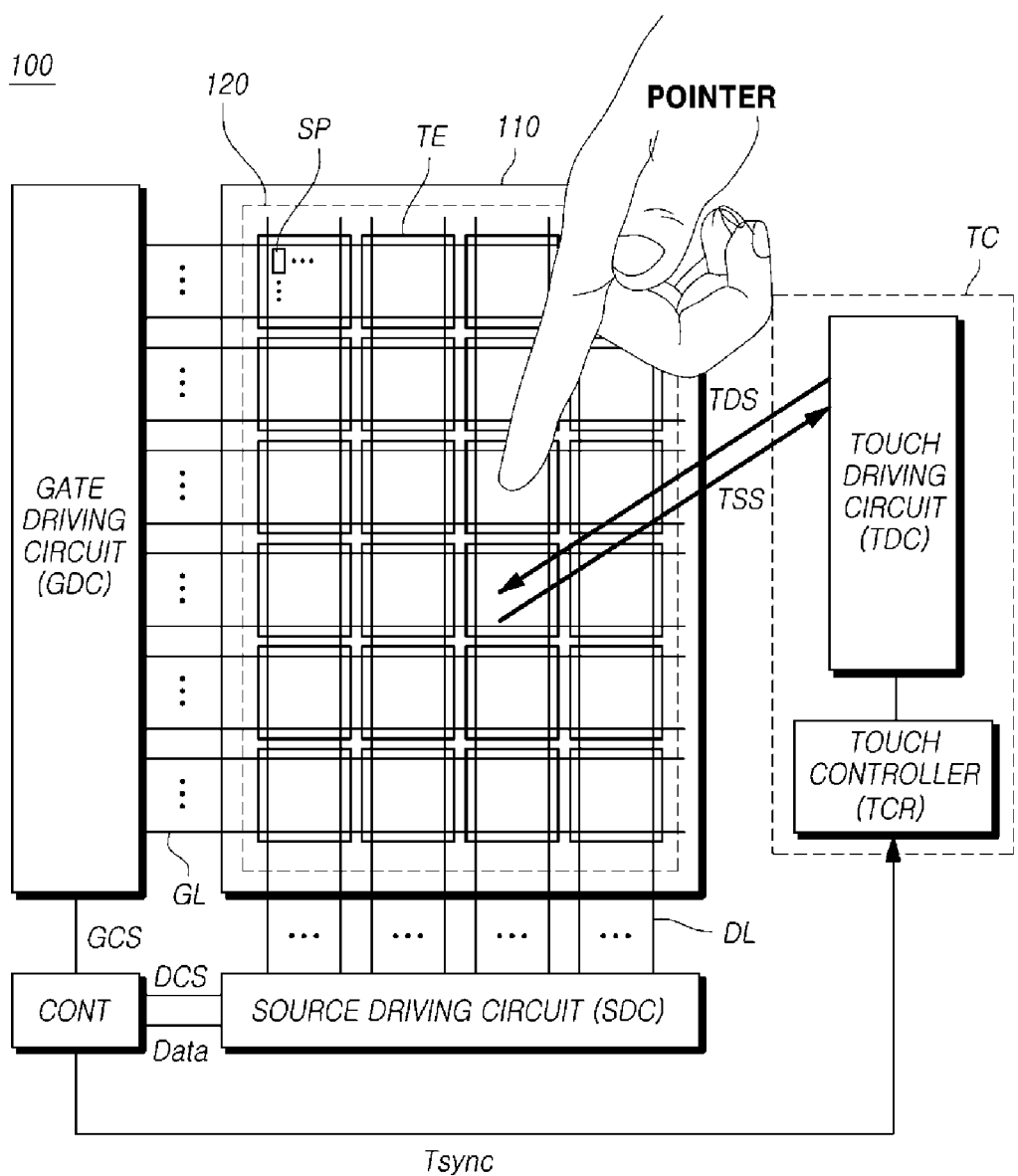
FIG. 1 illustrates the schematic system configuration of a touch display device according to aspects of the present disclosure.

Hereinafter, exemplary aspects of the present disclosure will be described in detail with reference to the accompanying drawings. In assigning reference numerals to elements in the drawings, the same reference numerals will designate the same elements where possible although they are shown in different drawings. Also, in the following description of the present disclosure, a detailed description of known functions and configurations incorporated herein will be omitted when it may make the subject matter of the present disclosure rather unclear.

In addition, such terms as "first", "second", "A", "B", "(a)", "(b)", and the like, may be used herein when describing elements of the present disclosure. These terms are merely used to distinguish one element from other elements, and the essence of a corresponding element, an order thereof, a sequence thereof, or the number of the corresponding elements are not limited by the terms. When an element is described as being "connected", "coupled", or "linked" to another element, it will be understood that the element may not only be directly connected or coupled to said another element, but may also be "connected", "coupled", or "linked" to said another element through a third element, or the third element may also be interposed between the element and said another element.

FIG. 1 illustrates the schematic system configuration of a touch display device according to aspects of the present disclosure.

The touch display device 100 according to the aspects of the present disclosure includes a display panel 110 on which a plurality of data lines DL and a plurality of gate lines GL are disposed and a plurality of sub-pixels SP defined by the plurality of data lines DL and the plurality of gate lines GL is arranged.

Further, the touch display device 100 may include a touch panel 120 on which a plurality of touch electrodes TE serving as a touch sensor for touch sensing is disposed.

The touch panel 120 may be manufactured separately from the display panel 110 and may be bonded to the display panel 110 or may be embedded in the display panel 110.

Figure 4:
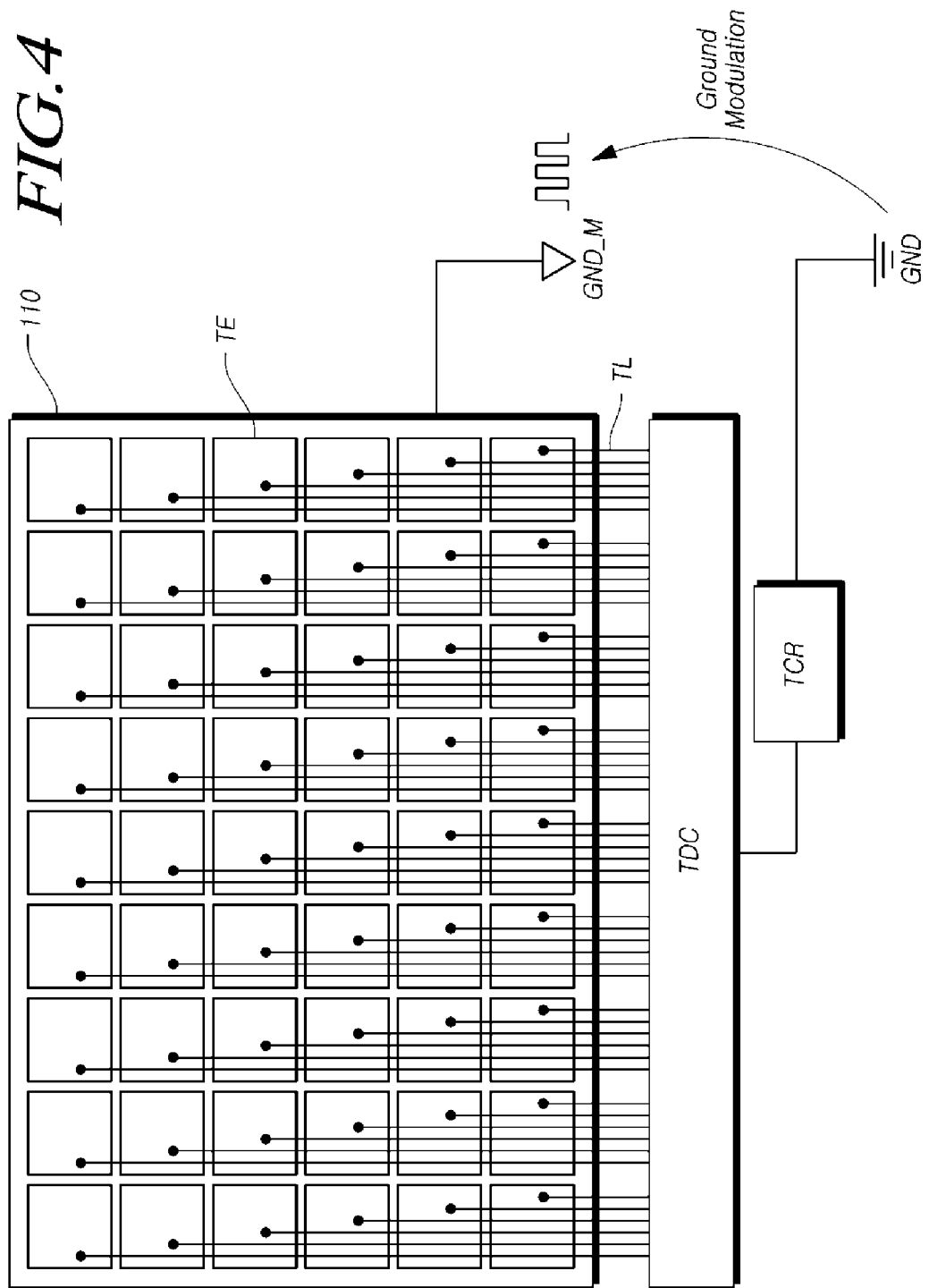
FIG. 4 illustrates ground voltage modulation for time-free driving in a touch display device according to aspects of the present disclosure.

When the touch panel 120 is embedded in the display panel 110, the touch panel 120 may be regarded as an assembly of a plurality of touch electrodes TE and a plurality of touch lines TL (see FIG. 4).

When the touch panel 120 is embedded in the display panel 110, the plurality of touch electrodes TE may be arranged in an in-cell type or an on-cell type and may be manufactured together with the display panel 110.

For the convenience of explanation, the following description will be made assuming that the touch panel 120 is embedded in the display panel 110, and the display panel 110 and the touch panel 120 are not separately distinguished.

The touch display device 100 according to the aspects of the present disclosure has two driving operations, which are a display operation for displaying an image and a touch operation for touch sensing.

The touch display device 100 includes a source driving circuit (SDC) to drive the plurality of data lines DL and a gate driving circuit (GDC) to drive the plurality of gate lines GL in order to drive the display panel 110 during a display period in which a display operation is performed.

The source driving circuit (SDC) may be configured by including at least one source driver integrated circuit (SDIC).

Each source driver integrated circuit (SDIC) may include a shift register, a latch circuit, a Digital-to-Analog Converter (DAC), and an output buffer.

Each source driver integrated circuit (SDIC) may further include an Analog-to-Digital Converter (ADC) as necessary.

The gate driving circuit (GDC) may be configured by including at least one gate driver integrated circuit (GDIC).

Each gate driver integrated circuit (GDIC) may include a shift register and a level shifter.

The source driving circuit (SDC) may be disposed on only one side (e.g., upper or lower side) of the display panel 110, or may be disposed on both sides (e.g., upper and lower sides) of the display panel 110 as necessary depending on a driving type or a panel design type.

The gate driving circuit (GDC) may be disposed on only one side (e.g., right or left side) of the display panel 110, or may be disposed on both sides (e.g., right and left sides) of the display panel 110 as necessary depending on a driving type or a panel design type.

The touch display device 100 may further include a controller CONT to supply various control signals (data control signal DCS and gate control signal GCS) to the source driving circuit (SDC) and the gate driving circuit (GDC) and to control the source driving circuit (SDC) and the gate driving circuit (GDC).

The controller CONT starts scanning according to timing implemented for each display frame, converts input image data, which is input from the outside, in accordance with a data signal format used in the source driving circuit (SDC), outputs converted image data Data, and controls data driving at proper time according to scanning.

The controller may be a timing controller generally used in display technology or may be a control device that includes a timing controller and performs other additional control functions.

Further, the controller CONT may transmit a touch synchronization signal Tsync to a touch circuit TC. The touch synchronization signal Tsync is a signal for defining a period in which the touch panel 120 performs a touch operation for touch sensing.

Referring to FIG. 1, the touch display device 100 may include a touch circuit TC that drives the touch panel 120 during a touch period, receives a signal from the touch panel 120, and performs touch sensing and pen touch sensing on the basis of the received signal.

The touch circuit TC may generate a touch driving signal TDS for driving the plurality of touch electrodes TE during a touch period defined according to the touch synchronization signal Tsync received from the controller CONT and may output the touch driving signal to the touch electrodes TE.

The touch circuit TC may include a touch driving circuit (TDC) to drive the plurality of touch electrodes TE and a touch controller (TCR) to determine the occurrence of a touch and/or a touch position on the basis of a signal received from touch electrodes TE to which a touch driving signal TDS is applied during a touch period.

In the aspects of the present disclosure, the touch controller (TCR) may be embedded in the controller CONT (or a timing controller).

The touch driving circuit (TDC) may be electrically connected to the plurality of touch electrodes TE through a plurality of signal lines and may supply a touch driving signal TDS to the plurality of touch electrodes TE, thereby driving the plurality of touch electrodes TE.

In addition, the touch driving circuit (TDC) may receive a touch sensing signal TSS from each touch electrode TE that is supplied with a touch driving signal TDS.

The touch driving circuit (TDC) transmits the received touch sensing signal TSS or sensing data TSD (see FIG. 5) obtained by processing the touch sensing signal TSS to the touch controller (TCR).

The touch controller (TCR) may execute a touch algorithm using the touch sensing signal TSS or the sensing data TSD, thereby determining the occurrence of a touch and/or a touch position.

Although not shown, the touch display device 100 may include a touch driving signal generator (not shown) to generate a touch driving signal TDS. The touch driving signal generator may be disposed inside or outside the touch driving circuit (TDC).

The touch driving signal generator may be disposed inside or outside the touch controller (TCR). If necessary, the touch driving signal generator may be configured as a separate power controller integrated circuit.

The touch controller (TCR) may transmit a touch driving control signal to the touch driving signal generator and the touch driving circuit (TDC) within the touch period according to the touch synchronization signal Tsync received from the controller CONT.

In response to the touch driving control signal, the touch driving signal generator may generate a touch driving signal TDS and may output the touch driving signal TDS to the touch driving circuit TDC in the touch period.

The touch controller (TCR) according to the aspects of the present disclosure may employ a self-capacitance-based touch sensing method in which a change in self-capacitance between each touch electrode TE and a pointer is detected to determine the occurrence of a touch and/or a touch position.

The touch display device 100 according to the aspects of the present disclosure may employ a mutual capacitance-based touch sensing method, in which the plurality of touch electrodes TE is classified into a driving electrode (also referred to as a touch driving electrode or a transmission (Tx) electrode) and a sensing electrode (also referred to as a touch sensing electrode or a reception (Rx) electrode), which are electrically isolated from each other, a touch driving signal TDS is applied to the driving electrode, and the sensing electrode receives a touch sensing signal TSS, thereby detecting a change in mutual capacitance between the driving electrode and the sensing electrode and thus determining the occurrence of a touch and/or a touch position.

The source driving circuit (SDC), the gate driving circuit (GDC), the touch driving circuit (TDC), and the touch controller (TCR) are functionally classified and may be separately configured. As necessary, two or more of the source driving circuit (SDC), the gate driving circuit (GDC), the touch driving circuit (TDC), and the touch controller (TCR) may be integrated into a configuration.

For example, the touch driving circuit (TDC) may be integrated with the source driving circuit (SDC) into an integrated driving circuit (SRIC).

The integrated driving circuit (SRIC) may be configured as a chip-on-film type. In this case, the integrated driving circuit (SRIC) may be mounted on a source circuit film (SF).

One end of the source circuit film (SF) may be electrically connected (bonded) to the display panel 110, and the other end of the source circuit film (SF) may be electrically connected (bonded) to a source printed circuit board (SPCB).

The source printed circuit board (SPCB) may be connected to a control printed circuit board (CPCB), on which the controller CONT is mounted, via a connection member, such as a flexible flat cable (FFC).

The integrated driving circuit (SRIC) may be configured as a chip-on-glass (COG) type disposed on the touch panel (TSP).

The gate driving circuit (GDC) may also be a chip mounted on a gate circuit film (GF) connected to the display panel 110 and, as necessary, may be mounted as a gate-in-panel (GIP) chip on the display panel 110.

When the touch driving signal generator is not included in the touch driving circuit (TDC) or the touch controller (TCR) but is configured as a separate power controller integrated circuit, the touch driving signal generator may be mounted on the source printed circuit board (SPCB) or control printed circuit board (CPCB).

In the aspects of the present disclosure, one touch electrode TE may be larger in size than one sub-pixel SP. That is, one touch electrode TE may have a size that is equal to or larger than a region occupied by a plurality of sub-pixels SP.

For example, one touch electrode (TE, unit touch electrode) may have a size several times to hundreds of times larger that of one sub-pixel SP.

The ratio between the size of a touch electrode and the size of a sub-pixel may be adjusted considering touch sensing efficiency and performance or the impact of touch sensing on display.

For example, the touch display device 100 may divide a common electrode (Vcom electrode) used for a display operation into a plurality of blocks to be used as a plurality of touch electrodes TE.

The display panel 110 may be various types of panels, such as a liquid crystal display panel and an organic light emitting display panel. For example, when the display panel 110 is a liquid crystal display panel, the touch display device 100 may divide a common electrode, which receives a common voltage (Vcom) to form an electric field with a pixel electrode, into a plurality of blocks to be used as a plurality of touch electrodes TE.

In another example, when the display panel 110 is an organic light emitting display panel, the touch display device 100 may include a plurality of touch electrodes TE formed on a touch sensor metal layer disposed on an encapsulation layer that is disposed over a first electrode, an organic light emitting layer, and a second electrode, which are included in an organic light emitting diode, and has an encapsulation function.

For the convenience of explanation, the following description will be made assuming that the plurality of touch electrodes TE is used as touch driving electrodes (touch sensors) in a touch operation and is used as common electrodes (Vcom electrodes) in a display operation.

The integrated driving circuit (SRIC) may be configured as a chip-on-film type.

In this case, the integrated driving circuit (SRIC) may be mounted on a source circuit film (SF).

The touch driving circuit (TDC) and the source driving circuit (SDC) may be configured as separate driving chips. The touch driving circuit (TDC) may be electrically connected to the plurality of touch electrodes TE included in a touch screen panel (TSP) through a plurality of signal lines (SL).

One end of the source circuit film (SF) may be electrically connected (bonded) to the display panel 110, and the other end of the source circuit film (SF) may be electrically connected (bonded) to a source printed circuit board (SPCB).

The source printed circuit board (SPCB) may be connected to a control printed circuit board (CPCB), on which the controller CONT is mounted, via a connection member, such as a flexible flat cable (FFC).

Figure 2:
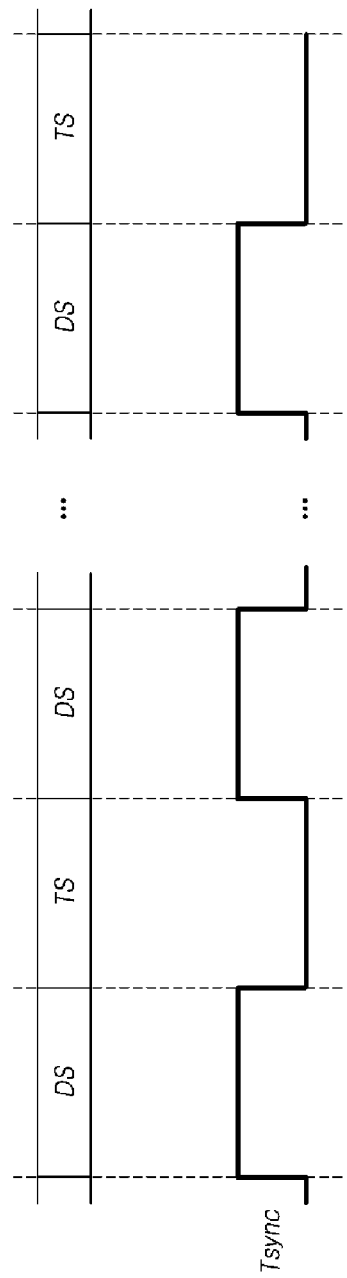
FIGS. 2 and 3 illustrate a display period and a touch period of a touch display device according to aspects of the present disclosure.
Figure 3:
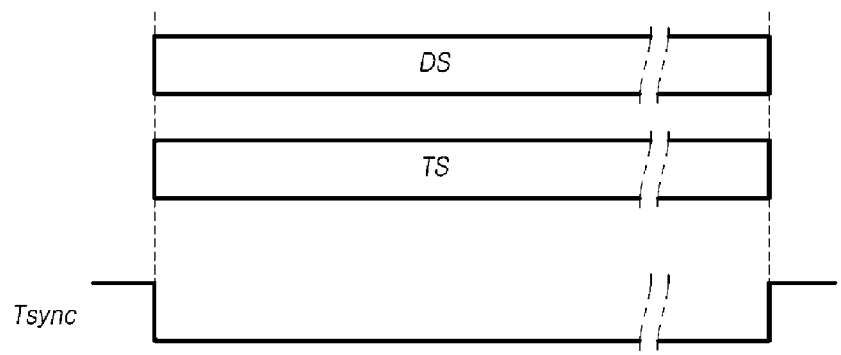

FIGS. 2 and 3 illustrate a display period and a touch period of a touch display device according to aspects of the present disclosure.

The touch display device 100 according to the aspects of the present disclosure may perform a driving operation by a time division driving method and/or a time-free driving method.

Referring to FIG. 2, when the touch display device 100 operates by the time division driving method, the touch display device 100 may perform a display operation for providing an image display function and a touch operation for providing a touch sensing function respectively in a display period DS and a touch period TS according to time division.

In this case, the display period DS and the touch period TS may be controlled in timing by a touch synchronization signal Tsync. That is, the touch synchronization signal Tsync may be used as a signal for defining not only the touch period TS but also the display period DS.

During the display period DS, a common voltage, which is a DC voltage, may be applied to the plurality of touch electrodes TE.

Here, the common voltage may be a voltage that forms an electric field with a pixel voltage applied to a pixel electrode in each sub-pixel.

During the touch period TS, a touch driving signal TDS may be applied to all or some of the plurality of touch electrodes TE.

The touch driving signal TDS may be a pulse signal with a variable voltage level.

Methods of time-dividing one display frame period into a display period DS and a touch period TS may be further classified into a V-sensing method and an H-sensing method.

In the V-sensing method, one display frame period is time-divided into one display period DS and one or more touch periods TS.

During one display period DS, the touch display device 100 performs a display operation for one display frame.

During one or more touch periods TS, the touch display device 100 senses the occurrence of a touch or a touch position in one display frame area.

In the H-sensing method, one display frame period is time-divided into two or more display periods DS and two or more touch periods TS.

During two or more display periods DS, the touch display device 100 performs a display operation for one display frame.

During two or more touch periods TS, the touch display device 100 senses the occurrence of a touch or a touch position in one display frame area.

Referring to FIG. 3, when the touch display device 100 operates by the time-free driving method, the touch display device 100 may simultaneously perform a display operation for providing an image display function and a touch operation for providing a touch sensing function. The time-free driving method is also referred to as a simultaneous driving method.

As the touch display device 100 has a larger screen and a higher resolution, increasing time is required for a display period and a touch period. Therefore, when a display period and a touch period, which are time-divided, are separately distinguished, the display period and the touch period may exceed one display frame period.

However, in the time-free driving method, since a display period and a touch period may overlap, constraints of time on the display period and the touch period may be reduced.

Although FIG. 3 shows that a display period and a touch period are the same period, the display period and the touch period may have different driving start points or driving end points.

That is, the display period in which the display panel 110 is driven in a display mode and the touch period for the touch panel 120 may at least partly overlap in time.

When the touch display device 100 performs a driving operation by the time-free driving method, the touch driving circuit (TDC) may be configured, for example, to output sensing data TSD including a value corresponding to the difference between sensing signals corresponding to two touch electrodes.

That is, the touch circuit TC may detect the occurrence of a touch or the coordinates of a touch on the basis of sensing data TSD including a value corresponding to the difference between a first sensing signal (TSS1) and a second sensing signal (TSS2) received from a first touch line (TL1) and a second touch line (TL2) among a plurality of touch lines TL during a display operation in which data voltages (Vdata) are applied to the plurality of data lines DL.

This method may be referred to as a differential sensing method.

A touch driving signal TDS may be a signal for driving the touch electrodes TE for touch sensing and may also be a common voltage for allowing the touch electrodes TE to serve as a common electrode for a display operation.

For example, a touch driving signal TDS may be a common voltage that forms capacitance with a data voltage (Vdata) supplied to each of two or more sub-pixels SP overlapping each touch electrode TE.

That is, a touch driving signal TDS may be a voltage that forms capacitance with a data voltage (Vdata) supplied to each of two or more sub-pixels SP overlapping a first touch electrode (TE1) and may also be a voltage that forms capacitance with a data voltage (Vdata) supplied to each of two or more sub-pixels SP overlapping a second touch electrode (TE2)

When the touch display device 100 operates by the time-free driving method, a common voltage that forms an electric field with a pixel voltage applied to a pixel electrode in each sub-pixel may not be a DC voltage but may be a pulse signal with a variable voltage level.

When the touch display device 100 performs a driving operation by the time-free driving method, the plurality of touch electrodes TE may be a common electrode that is divided into a plurality of blocks, and a touch driving signal TDS may be considered as a common voltage.

In this case, a touch synchronization signal Tsync may be used as a signal for defining a touch period regardless of a display period.

FIG. 4 illustrates ground voltage modulation for time-free driving in a touch display device according to aspects of the present disclosure.

In the touch display device 100, a touch driving signal TDS for time-free driving may be a voltage corresponding to a ground voltage GND_M to which the display panel 110 is grounded.

The ground voltage GND_M to which the display panel 110 is grounded may be a signal with a variable voltage level.

The touch driving signal TDS may correspond in frequency and phase to the ground voltage GND_M to which the display panel 110 is grounded.

The ground voltage GND_M to which the display panel 110 is grounded may be a modulated signal based on a ground voltage GND in a DC voltage type to which the touch controller TCR sensing the occurrence of a touch or a touch coordinate or the controller CONT controlling a display operation are grounded during a display operation.

Regarding ground modulation and the touch driving signal TDS described above, as the display panel 110 is grounded to a modulated ground voltage (GND_M), even if a touch driving signal TDS of a DC voltage type is applied to the touch electrodes TE as a common electrode arranged on the display panel 110, the touch driving signal TDS is shaken by the modulated ground voltage (GND_M) and thus becomes a signal with a variable voltage level the same as or similarly to the modulated ground voltage (GND_M).

The touch driving signal TDS for time-free driving may be a voltage corresponding to the ground voltage GND_M to which the display panel 110 is grounded.

Figure 5:
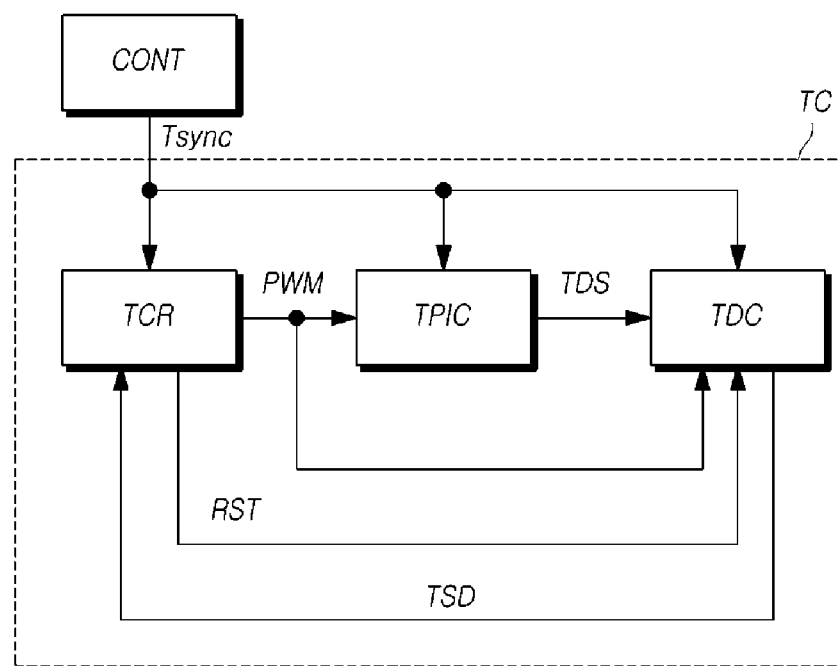
FIG. 5 illustrates the schematic configuration of a touch circuit according to aspects of the present disclosure.

FIG. 5 illustrates the schematic configuration of a touch circuit according to aspects of the present disclosure.

Referring to FIG. 5, the touch circuit TC may include a touch controller TCR, a touch driving signal generator TPIC, and a touch driver TDC.

The touch controller TCR receives a touch synchronization signal Tsync for defining a touch period TS from a controller CONT.

Here, as described above, the touch synchronization signal Tsync may be a signal used to separately define a display period DS and a touch period TS or may be a signal used to define only a touch period TS regardless of a display period DS.

The touch controller TCR may generate a touch driving generation signal PWM in the touch period TS according to the received touch synchronization signal Tsync and may output the touch driving generation signal to the touch driving signal generator TPIC and the touch driver TDC.

Here, the touch controller TCR may output the touch driving generation signal PWM, which is toggled a plurality of times during the touch period TS defined by the touch synchronization signal Tsync, to the touch driver TDC.

The number of times the touch driving generation signal PWM is toggled during the touch period TS may change depending on the total number of touch electrodes TE sensed during one touch period TS and the number of touch electrodes TE simultaneously sensed by the touch driver TDC.

Although not shown, the touch controller TCR may transmit a clock signal (ECLK) to the touch driving signal generator TPIC and the touch driver TDC to synchronize the operations of the touch controller TCR, the touch driving signal generator TPIC, and the touch driver TDC of the touch circuit TC.

The touch controller TCR may autonomously generate the clock signal (ECLK) or may receive the clock signal (ECLK) from a controller CONT.

The touch driving signal generator TPIC may generate a touch driving signal TDS according to the touch driving generation signal PWM and may output the touch driving signal TDS to the touch driver TDC.

That is, the touch driving generation signal PWM is a signal for generating a touch driving signal TDS and may determine the frequency, phase and amplitude of the touch driving signal TDS.

Here, the touch driving signal generator TPIC may generate a touch driving signal TDS having a signal waveform corresponding to the signal waveform of the touch driving generation signal PWM.

For example, the touch driving signal generator TPIC may generate a touch driving signal TDS having the same frequency as that of the touch driving generation signal PWM. That is, the touch driving signal generator TPIC may generate a touch driving signal TDS that is toggled the same number of times as the touch driving generation signal PWM during the touch period TS.

The touch driving signal TDS is provided to a plurality of touch electrodes TE to drive the plurality of touch electrodes TE. Therefore, to stably drive the plurality of touch electrodes TE, the amplitude (the voltage difference between a high-level voltage and a low-level voltage) of the touch driving signal TDS needs to be large (e.g., −4 V to 8 V).

However, in general, a touch driving generation signal PWM output from a touch controller TCR configured as a digital circuit element is set to have a small amplitude (e.g., 0 to 1.8 V) for low power consumption.

Therefore, even though the touch driving signal TDS has a signal waveform with a frequency and a phase the same as that of the touch driving generation signal PWM, the touch driving signal generator TPIC is needed to improve the driving capability of the touch driving signal TDS.

Here, the touch driving signal generator TPIC may receive a touch synchronization signal Tsync and may be configured to generate and output a touch driving signal TDS only in the touch period TS according to the received touch synchronization signal Tsync.

That is, even though a toggled touch driving generation signal PWM is received, the touch driving signal generator TPIC may prevent a touch driving signal TDS from being toggled in a period other than a touch period TS.

The touch driving signal generator TPIC may output a signal with a predetermined voltage level to the touch driver TDC in a period other than the touch period TS.

For example, the touch driving signal generator TPIC may output, to the touch driver TDC, a common voltage (Vcom) corresponding to a pixel voltage (data voltage or corresponding voltage) applied to a pixel electrode during a period other than the touch period TS.

The touch driver TDC supplies a touch driving signal TDS, received in the touch period TS according to the received touch synchronization signal Tsync, to a plurality of touch electrodes TE and drives the touch electrodes TE.

In driving the plurality of touch electrodes TE, the touch driver TDC may sequentially drive the plurality of touch electrodes TE by one or by two or more or may simultaneously drive all of the plurality of touch electrodes TE.

Here, the touch driver TDC may receive a touch driving generation signal PWM from the touch controller TCR, thereby accurately determining time to supply the touch driving signal TDS to the plurality of touch electrodes TE.

A touch electrode TE to which a touch driving signal TDS is applied may form parasitic capacitance (Cp) with each of a data line DL, a gate line GL, and another touch electrode TE to which the touch driving signal TDS is not applied. The parasitic capacitance (Cp) may act as a load in touch sensing and may be a major factor to reduce sensing accuracy.

Thus, when applying a touch driving signal TDS to at least one touch electrode TE during a touch period, the touch display device 100 may apply the touch driving signal TDS or a corresponding signal to all or some of a plurality of data lines DL, a plurality of gate lines GL, and the remaining touch electrodes.

Here, the signal corresponding to the touch driving signal TDS may be referred to as a load-free driving signal (LFDS), and a driving method in which a load-free driving signal (LFDS) is applied to all or some of a plurality of data lines DL, a plurality of gate lines GL, and the remaining touch electrodes to prevent parasitic capacitance (Cp) from being generated may be referred to as load-free driving.

Here, the load-free driving signal (LFDS) may be a signal completely or substantially the same as the touch driving signal TDS, or may be a signal different from or similar to the touch driving signal TDS as long as the signal can eliminate or reduce parasitic capacitance between a touch electrode TE for touch sensing and other electrodes.

The touch driver TDC receives a touch sensing signal TSS from each touch electrode TE supplied with a touch driving signal TDS and transmits the received touch sensing signal TSS or sensing data TSD obtained by signal processing of the touch sensing signal TSS to the touch controller TCR according to a predetermined interface.

In the following description, the touch driver TDC transmits the sensing data TSD obtained by signal processing of the touch sensing signal TSS to the touch controller TCR.

For example, the touch driver TDC may transmit the sensing data TSD to the touch controller TCR using Serial Peripheral Interface (hereinafter, SPI) communication.

Also, the touch driver TDC may transmit the sensing data TSD to the touch controller TCR using Low Voltage Differential Sinaling (LVDS) communication. However, a transmission method is not limited thereto.

Here, the touch sensing signal TSS is a signal with a waveform that varies depending on a change in capacitance in each of the plurality of touch electrodes TE.

Thus, the touch controller TCR may execute a touch algorithm using the sensing data TSD and may detect the occurrence of a touch and/or a touch position.

Here, the touch controller TCR may analyze whether the sensing data TSD is received and whether the value of the received sensing data TSD is abnormal. As a result of analysis, when it is determined that the sensing data TSD is not received or that there is an abnormality in the received sensing data TSD, the touch controller TCR transmits a reset signal RST to the touch driver TDC and initializes the touch driver TDC.

For example, when the value of the received sensing data TSD is within a predetermined normal data range, the touch controller TCR may determine that the sensing data TSD is normal sensing data TSD. When the value of the received sensing data TSD is out of the normal data range, the touch controller TCR may determine that the sensing data TSD is abnormal sensing data (ATSD).

Figure 8:
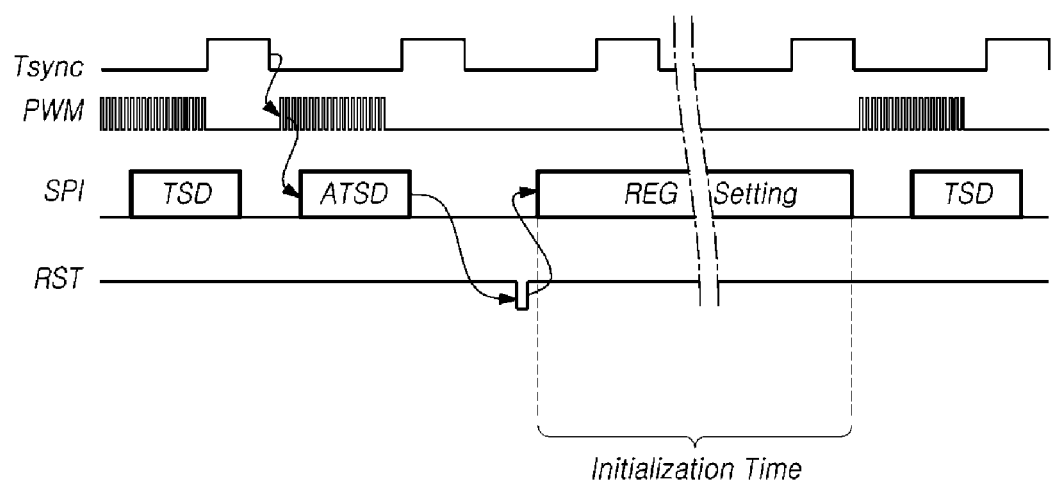
FIG. 8 is a timing diagram illustrating the operation of the touch driver of FIG. 6.

Further, when the value of the received sensing data TSD has a predetermined particular pattern (e.g., "00000000" or "11111111"), the touch controller TCR may determine that the sensing data TSD is abnormal sensing data ATSD (see FIG. 8).

Figure 6:
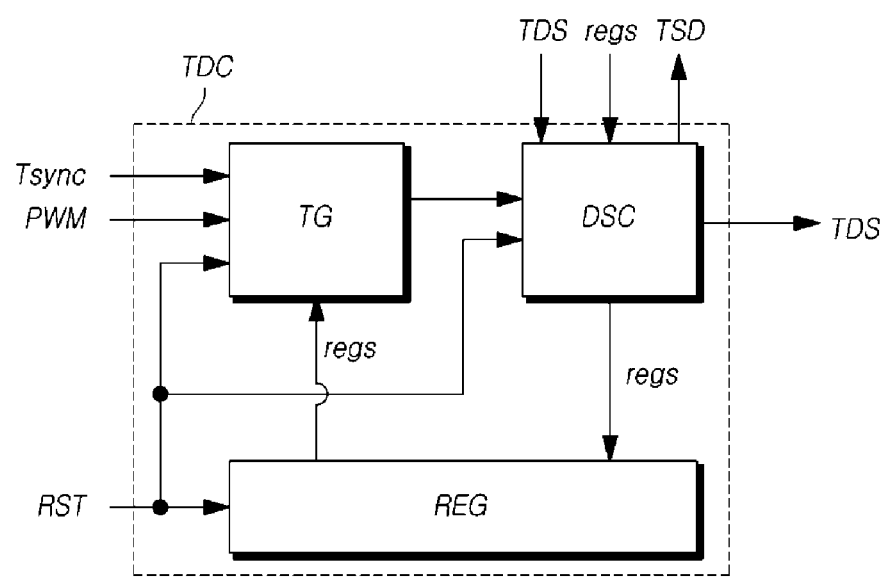
FIG. 6 illustrates the schematic configuration of a touch driver according to aspects of the present disclosure.

FIG. 6 illustrates the schematic configuration of a touch driver according to aspects of the present disclosure.

Referring to FIG. 6, the touch driver TDC according to the aspects of the present disclosure may include a timing generator TG, a register REG, and a driving sensor DSC.

First, the timing generator TG receives a touch synchronization signal Tsync and a touch driving generation signal PWM and controls the operation timing of the driving sensor DSC.

The timing generator TG may receive a touch synchronization signal Tsync to determine a touch period TS and designates time for the driving sensor DSC to supply a touch driving signal TDS to a plurality of touch electrodes TE according to a touch driving generation signal PWM received in the touch period TS.

Here, the timing generator TG may count the number of times the touch synchronization signal Tsync is activated to a first designated level (e.g., low level or high level) and the number of times the touch driving generation signal PWM is toggled during the touch period TS and may transmit the counts to the driving sensor DSC.

The register REG stores a set value regs for setting time to control the operation timing of the driving sensor DSC and transmits the stored set value regs to the timing generator TG so that the timing generator TG can control the driving sensor DSC.

For example, the register REG may store, as a set value regs, the number of times the touch synchronization signal Tsync is activated while driving all of a plurality of touch electrodes TE of a display panel 110.

The number of times the touch synchronization signal Tsync is activated while driving all of the plurality of touch electrodes TE is a variable value depending on the foregoing touch driving methods. The register REG may also store a set value relating to whether a touch driving method is a time division driving method, a time-free driving method, a V-sensing method, or an H-sensing method.

The register REG may store, as a set value regs, the number of times the touch driving generation signal PWM is toggled during the touch period TS in which the touch synchronization signal Tsync is activated to the first level.

For example, the register REG may store, as a set value regs, the number of times the touch driving generation signal PWM, which is toggled while the touch synchronization signal Tsync is activated, is received depending on a mode of sensing a touch with a finger or a pen or a mode of data transmission and reception with a pen.

An active pen may perform an interworking operation through data transmission and reception with a touch display device 100.

Here, the active pen is also referred to as a stylus, a stylus pen, or an active stylus pen. The active pen refers to a pen that performs data transmission and reception with the touch display device 100 so that pen position and pressure (also referred to as tip pressure, pen pressure, or writing pressure), tilt (also referred to as inclination or pen tilt), and pen button input processing functions can be implemented in the touch display device 100.

The touch display device 100 using the active pen needs to perform data transmission and reception with the active pen, instead of merely sensing the occurrence of a touch with a finger or a pen or a touch position. To this end, the number of times and the time the touch driving generation signal PWM is received may be set to be different from those in a case of sensing a touch. Here, the driving sensor DSC may perform data transmission and reception with the active pen depending on the set number of times and the set time the touch driving generation signal PWM is received.

The timing generator TG may control the driving timing of the driving sensor DSC according to a set value regs received from the register REG.

Here, the register REG may receive and store the set value regs through the driving sensor DSC that communicates with the touch controller TCR.

The driving sensor DSC supplies a touch driving signal TDS received from the touch driving signal generator TPIC to at least one touch electrode TE among the plurality of touch electrodes TE at timing designated by the timing generator TG, thereby driving the touch electrode TE.

The driving sensor DSC detects a touch sensing signal TSS received from the driven touch electrode TE and generates sensing data TSD based on the detected touch sensing signal TSS.

The driving sensor DSC transmits the generated sensing data TSD to the touch controller TCR by a predetermined communication method, and the touch controller TCR detects the occurrence of a touch and/or a touch position using the received sensing data TSD.

Here, the touch controller TCR may analyze whether the sensing data TSD is received at the designated timing and whether the received sensing data TSD has an abnormal value and may transmit a reset signal RST for initializing the touch driver TDC according to the analysis result.

The touch controller TCR may transmit the reset signal RST to the touch driver TDC to initialize the touch driver TDC even when initially driving the touch display device 100.

The reset signal RST may be transmitted to all of the timing generator TG, the register REG, and the driving sensor DSC of the touch driver TDC.

When the reset signal RST is received, the timing generator TG may initialize the counted number of times of the touch synchronization signal Tsync is activated and the counted number of times the touch driving generation signal PWM is toggled to a designated initial value (e.g., 0) and may resume counting the numbers.

When the reset signal RST is received, the register REG receives and stores a set value regs from the touch controller TCR. Then, the register REG transmits the stored set value regs to the timing generator TG so that the timing generator TG controls the driving sensor DSC according to the set value regs.

Upon receiving the reset signal RST, the driving sensor DSC is initialized.

For example, the driving sensor DSC may sequentially drive the plurality of touch electrodes TE according to a re-designated order regardless of the previous order in which the touch electrodes TE are driven.

Figure 7:
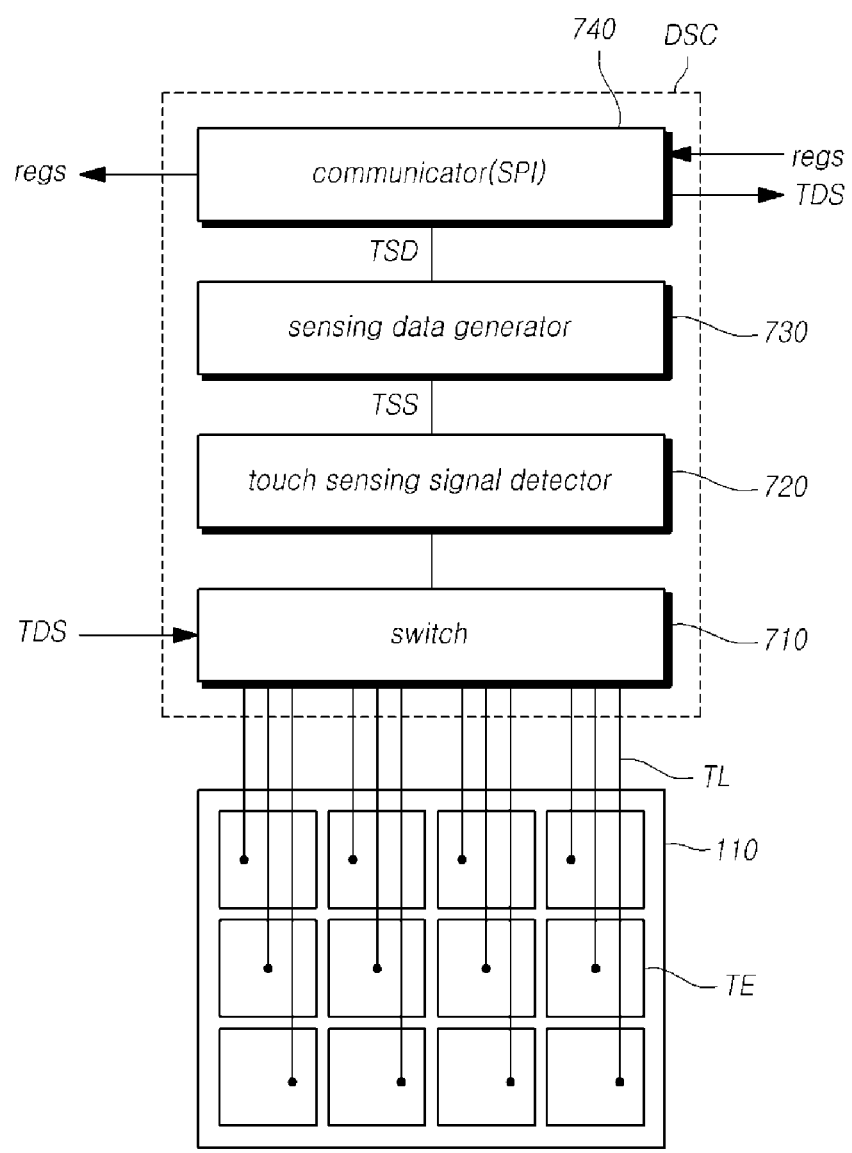
FIG. 7 illustrates the schematic configuration of a driving sensor (DSC) of FIG. 6.

FIG. 7 illustrates the schematic configuration of the driving sensor DSC of FIG. 6.

Referring to FIG. 7, the driving sensor DSC may include a switch 710, a touch sensing signal detector 720, a sensing data generator 730, and a communicator 740.

The switch 710 receives a touch driving signal TDS from a touch driving signal generator TPIC and provides the received touch driving signal TDS to a plurality of touch electrodes TE.

The switch 710 is provided to sequentially select one or more touch electrodes TE among the plurality of touch electrodes TE and to provide a touch driving signal TDS thereto.

To this end, the switch 710 may include one or more multiplexers.

The switch 710 allows a touch electrode TE provided with the touch driving signal TDS to be electrically connected to a touch sensing signal detector 720.

When the driving sensor DSC does not include the switch 710 and simultaneously provides a touch driving signal TDS to the plurality of touch electrodes TE, a touch driver TDC needs to be configured to simultaneously process touch sensing signals TSS received from the touch electrodes TE. Therefore, the touch driver TDC has a very complicated circuit configuration.

On the other hand, when the driving sensor DSC individually senses the plurality of touch electrodes TE, the time it takes to drive all the touch electrodes TE is significantly increased. That is, the time required for a touch period is increased.

Accordingly, the driving sensor DSC may include the switch 710 including one or more multiplexers so as to simultaneously sense two or more touch electrodes among the plurality of touch electrodes TE.

The touch sensing signal detector 720 may detect, through the switch 710, a touch sensing signal TSS received from one or more touch electrodes supplied with the touch driving signal TDS.

The touch sensing signal detector 720 detects a change in capacitance that varies depending on the occurrence of a touch, that is, whether a capacitor is formed between a touch electrode TE and a pointer, such as a finger or a pen, as a touch sensing signal TSS and transmits the touch sensing signal TSS to the sensing data generator 730.

The touch sensing signal detector 720 may include one or more detection circuits to each detect a touch sensing signal TSS.

The number of detection circuits may be the same as the number of multiplexers of the switch 710. The number of detection circuits and the number of multiplexers may be determined depending on the number of touch electrodes TE to be simultaneously supplied with a touch driving signal TDS among the plurality of touch electrodes TE.

That is, the plurality of touch electrodes TE may be grouped into at least one touch electrode group to be simultaneously supplied with a touch driving signal TDS at the same time according to the number corresponding to the number of detection circuits and the number of multiplexers.

The sensing data generator 730 generates sensing data TSD on the basis of a touch sensing signal TSS detected from each touch electrode.

The sensing data generator 730 may be configured as an analog-to-digital converter (ADC) to convert a touch sensing signal TSS, which is an analog signal, into sensing data TSD, which is digital data.

The communicator 740 communicates with a touch controller TCR using a designated mode. The communicator 740 may communicate with the touch controller TCR, for example, using an SPI communication mode.

The communicator 740 may receive a set value regs from the touch controller TCR and may transmit the set value regs to a register REG. The register REG may store the set value regs in an initialization operation.

The communicator 740 may transmit sensing data TSD obtained from the sensing data generator 340 to the touch controller TCR.

The touch controller TCR may detect the occurrence of a touch and/or a touch position according to the sensing data TSD received from the communicator 740 and may analyze whether the sensing data TSD is received and the received sensing data TSD has an abnormal value.

FIG. 8 is a timing diagram illustrating the operation of the touch driver of FIG. 6.

In FIG. 8, SPI refers to data transmitted between a touch controller TCR and a touch driver TDC.

The operation of the touch driver illustrated in FIG. 8 will be described with reference to FIGS. 6 and 7. First, a touch synchronization signal Tsync from the controller CONT is activated to a first level (here, low level) and is transmitted to the touch controller TCR, the touch driving signal generator TPIC and the touch driver TDC of the touch circuit TC.

Accordingly, the touch controller TCR generates a touch driving generation signal PWM and transmits the generated touch driving generation signal PWM to the touch driving signal generator TPIC and the touch driver TDC.

The touch driving signal generator TPIC generates a touch driving signal TDS on the basis of the touch driving generation signal PWM in a touch period TS according to the touch synchronization signal Tsync and transmits the touch driving signal TDS to the touch driver TDC. The touch driver TDC sequentially supplies the touch driving signal TDS, which is received at a timing designated by the touch driving generation signal PWM, to one or more touch electrodes TE of a plurality of touch electrodes TE and drives the touch electrodes TE.

The touch driver TDC detects a touch sensing signal TSS from the one or more driven touch electrodes TE, converts the detected touch sensing signal TSS into sensing data TSD, and transmits the sensing data TSD to the touch controller TCR.

The touch controller TCR determines whether the sensing data TSD is received at a designated timing and whether the received sensing data TSD is normal.

When it is determined that the received sensing data TSD is normal, the touch controller TCR detects the occurrence of a touch and/or a touch position on the basis of the sensing data TSD.

However, when it is determined that the sensing data TSD is not received at the designated time or that the sensing data TSD is received but is abnormal sensing data ATSD, the touch controller TCR transmits a reset signal RST to initialize the touch driver TDC.

In the touch display device 100, the touch driver TDC may malfunction due to EMI or other noise. In recent years, as touch display devices have high resolution, high-speed operations are required. Further, as touch display devices are enlarged, various kinds of transmission lines become long, and thus the impact of EMI and other noise becomes further significant. Therefore, the possibility of malfunction of the touch driver TDC is increasing.

In particular, an error may occur in data transmission/reception of an active pen that performs an interworking operation through signal transmission/reception with the touch display device 100.

Malfunction of the touch driver TDC may degrade the touch sensing accuracy of the touch display device 100 or may cause a touch sensing error. Therefore, the touch circuit TC of FIG. 5 allows the touch controller TCR to transmit a reset signal RST to the touch driver TDC and to initialize the touch driver TDC so that the touch driver TDC may operate normally.

However, as described above, when the reset signal RST is received, the register REG of the touch driver TDC receives and stores a set value regs from the touch controller TCR again.

Here, initialization time required for the register REG to receive and store the set value regs from the touch controller TCR is generally dozens of ms or longer.

That is, the initialization time is much longer than a touch frame, which is a period in which all of the plurality of touch electrodes TE included in the touch display device 100 is sensed once with the touch driver TDC in a normal state.

That is, the initialization time corresponds to a plurality of touch frame periods.

Therefore, when a malfunction occurs due to EMI or other noise, the touch circuit TC cannot recognize continuous touch even if initialized.

A malfunction or an error in the touch driver TDC may cause more serious problems in continuous touch input of touch and drag than in general touch input and thus may reduce the reliability of a user.

Generally, when a malfunction occurs in a touch input, an electronic device does not perform any operation because the touch is not recognized. However, when a malfunction occurs during a continuous touch input, an electronic device may perform an operation not intended by a user as the continuity of the touch input is terminated. Therefore, a malfunction during a continuous touch input may cause more serious inconvenience to a user.

Generally, the touch circuit TC may recognize a continuous touch input when at least one touch is sensed in each of a plurality of consecutive touch frame periods.

However, since the touch driver TDC illustrated in FIG. 6 is initialized during a plurality of touch frame periods, even though the touch driver TDC is initialized to correct a malfunction, a long initialization time does not allow the touch driver TDC to maintain the continuity of touch input.

Particularly, pen-touch technology has been developed in recent years in response to a growing demand for elaborate pen-touch input, in addition to finger-touch input. Pen-touch input is widely used for a line drawing operation through a continuous touch input.

When a malfunction occurs in the touch circuit during line drawing, even though the touch driver TDC is initialized, a long initialization time may interrupt a line which is being drawn.

Figure 9:
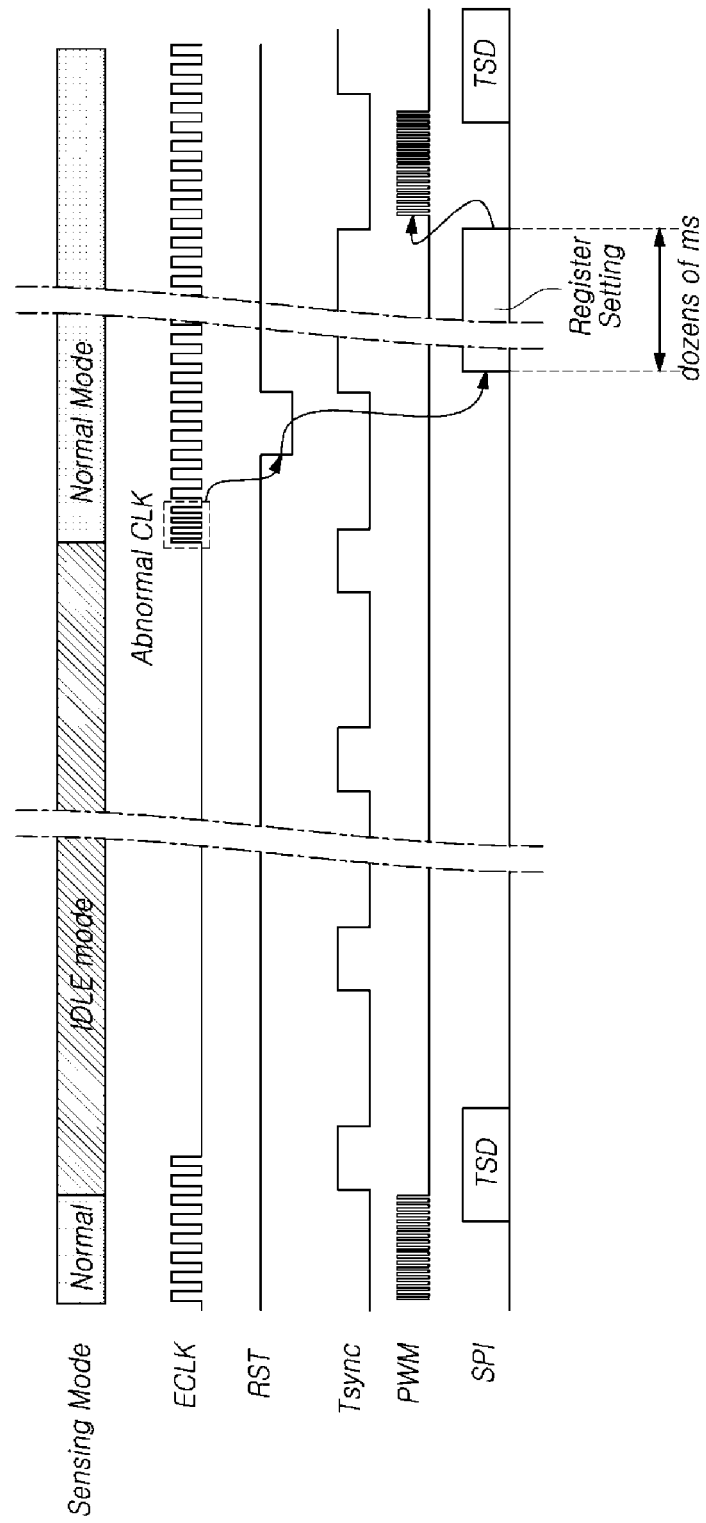
FIG. 9 is a timing diagram illustrating the operation of the touch driver of FIG. 6 in a mode switch.

FIG. 9 is a timing diagram illustrating the operation of the touch driver of FIG. 6 in a mode switch.

Most touch display devices 100 in recent years provide an idle mode. For example, when a user command is not applied for a predetermined time or longer in a normal mode, the mode may be switched to the idle mode, and the idle mode may be performed.

As illustrated in FIG. 9, in the idle mode, the touch display device 100 may not generate a clock signal ECLK in order to reduce power consumption. Thereafter, when the mode is switched from the idle mode to the normal mode, the touch display device 100 generates a clock signal ECLK to perform a touch sensing operation.

As described above, a clock signal ECLK used in the touch circuit TC may be generated in the touch controller TCR or may be generated and transmitted from the controller CONT.

In most electronic devices including the touch display device 100, a high-frequency clock signal ECLK is generated using a phase-locked loop (PLL) circuit.

The clock signal ECLK is not generated as a stable signal when initially generated. That is, the signal is output in an abnormal state for a predetermined time, and is then stabilized and generated as a necessary-frequency signal.

However, the touch driver TDC of the touch circuit TC cannot recognize the abnormal state of the clock signal ECLK and thus may perform a touch sensing operation when switching to the normal mode.

When the touch driver TDC performs a touch sensing operation in the abnormal state of the clock signal ECLK, the touch driver TDC generates abnormal sensing data ATSD and transmits the abnormal sensing data ATSD to the touch controller TCR.

Accordingly, when the touch display device 100 is switched from the idle mode to the normal mode, the touch controller TCR transmits a reset signal RST to the touch driver TDC to initialize the touch driver TDC after a period in which the clock signal ECLK is stabilized, thereby preventing the touch driver TDC from generating abnormal sensing data ATSD.

Here, the period in which the clock signal ECLK is stabilized may be preset and stored in consideration of the characteristics of the circuit that generates the clock signal ECLK.

However, as described above, when the touch driver TDC is initialized so as not to generate abnormal sensing data ATSD, touch may not be sensed due to the long initialization time of the touch driver TDC corresponding to a plurality of touch frame periods.

Figure 10:
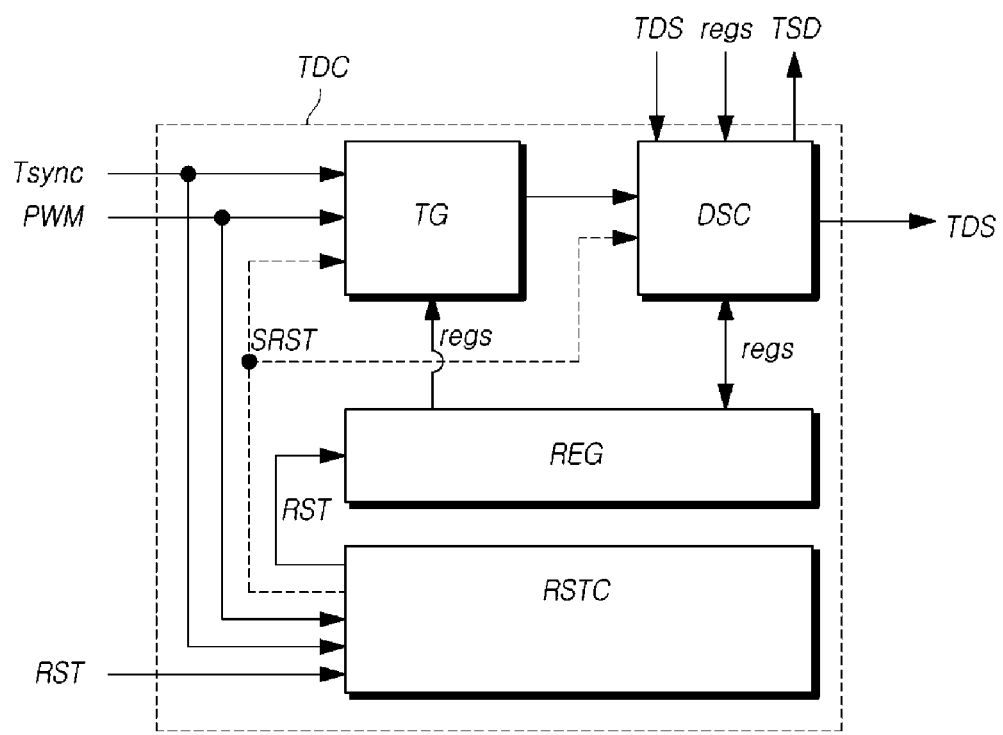
FIG. 10 illustrates the schematic configuration of a touch driver according to other aspects of the present disclosure.
Figure 11:
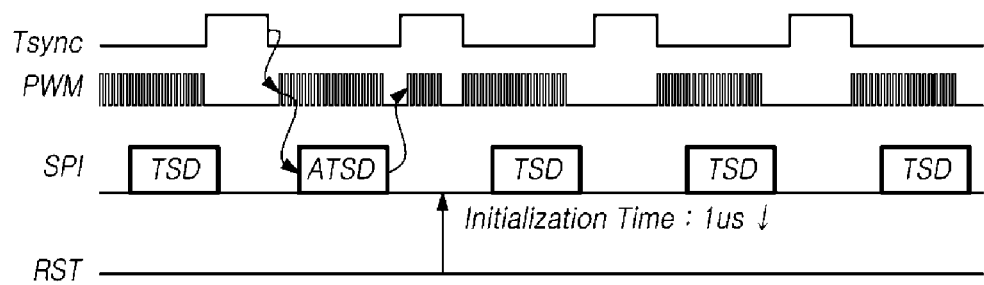
FIG. 11 is a timing diagram illustrating the operation of the touch driver of FIG. 10.

FIG. 10 illustrates the schematic configuration of a touch driver according to other aspects of the present disclosure, and FIG. 11 is a timing diagram illustrating the operation of the touch driver of FIG. 10.

Similarly to the touch driver TDC of FIG. 6, the touch driver TDC illustrated in FIG. 10 may include a timing generator TG, a register REG, and a driving sensor DSC. In addition, the touch driver TDC of FIG. 10 may further include a reset controller RSTC.

The added reset controller RSTC is configured to receive not only a reset signal RST from a touch controller TCR but also a touch synchronization signal Tsync and a touch driving generation signal PWM.

While a touch synchronization signal Tsync is activated to a first level (e.g. a low level), the touch controller TCR of the touch circuit TC generates a touch driving generation signal PWM and transmits the touch driving generation signal PWM to a touch driving signal generator TPIC and the touch driver TDC.

The touch controller TCR determines whether sensing data TSD is received from the touch driver TDC at a designated timing and whether the received sensing data TSD is normal.

When it is determined that the sensing data TSD is not received or the received sensing data TSD is abnormal sensing data ATSD, the touch controller TCR toggles and outputs the touch driving generation signal PWM a preset number of times (e.g., seven times) while the touch synchronization signal Tsync is inactivated to a second level (e.g., a high level).

As described above, even though the toggled touch driving generation signal PWM is received while the touch synchronization signal Tsync is inactivated, the touch driving signal generator TPIC does not generate a touch driving signal TDS.

That is, the touch driver TDC does not receive a touch driving signal TDS while the touch synchronization signal Tsync is inactivated.

However, the touch driver TDC receives the touch driving generation signal PWM generated by the touch controller TCR while the touch synchronization signal Tsync is inactivated.

When the touch driving generation signal PWM is toggled a designated number of times while the touch synchronization signal Tsync is inactivated to the second level (e.g., the high level), the reset controller RSTC of the touch driver TDC determines that a simplified initialization command is received.

When the simplified initialization command is received, the reset controller RSTC outputs a simplified reset signal SRST to the timing generator TG and the driving sensor DSC.

Accordingly, the timing generator TG and the driving sensor DSC may be initialized in response to the simplified reset signal SRST.

When the simplified reset signal SRST is received, the timing generator TG may initialize the counted number of activations of the touch synchronization signal Tsync and the counted number of toggles of the touch driving generation signal PWM to a designated initial value (e.g., 0) according to the set value regs transmitted from the register REG and may resume counting.

Upon receiving the simplified reset signal SRST, the driving sensor DSC is initialized and sequentially drives touch electrodes in a re-designated order regardless of the previous order in which the touch electrodes are driven.

That is, as the touch driver TDC of FIG. 10 further includes the reset controller RSTC, the timing generator TG, the register REG, and the driving sensor DSC are configured to receive a simplified reset signal SRST transmitted from the reset controller RSTC, instead of directly receiving a reset signal RST, unlike in FIG. 6.

However, even though a simplified initialization command is received from the touch controller TCR, the reset controller RSTC does not output a simplified reset signal SRST or a reset signal RST to the register REG. That is, the register REG is not initialized.

Generally, the set value regs pre-stored in the register REG is maintained not changed while the touch display device 100 is operating. Particularly, when the touch driver TDC is initialized in order to correct a malfunction in the touch driver TDC due to EMI or other noise, the set value regs stored in the register REG does not need to be changed.

Therefore, as the touch driver TDC of FIG. 10 further includes the reset controller RSTC, even though a simplified initialization command is received from the touch controller TCR, the register REG is not initialized and only the timing generator TG and the driving sensor DSC are initialized.

That is, since the register REG needs to receive and store the set value regs from the touch controller TCR, the register REG, which requires a very long initialization time, is not initialized, thereby considerably reducing the initialization time of the touch driver TDC in simplified initialization.

Here, in order to transmit the simplified initialization command to the touch driver TDC, the touch controller TCR toggles and outputs the touch driving generation signal PWM while the touch synchronization signal Tsync is inactivated, so that no additional line needs to be formed between the touch controller TCR and the touch driver TDC.

That is, in the structure of the existing touch driver TDC, only the internal structure of the touch driver TDC is changed in FIG. 10 while maintaining the structure of the touch circuit TC, thereby enabling the simplified initialization command to be transmitted.

Further, even when the touch display device 100 is switched from the idle mode to the normal mode, the touch controller TCR may output the simplified initialization command to the touch driver TDC.

After transmitting the simplified initialization command and simply initializing the touch driver TDC, the touch controller TCR generates a touch driving generation signal PWM again in a touch period TS, transmits the touch driving generation signal PWM to the touch driving signal generator TPIC and the touch driver TDC, and determines whether sensing data TSD is received at a designated timing from the touch driver TDC and whether the received sensing data TSD is normal.

When it is determined that the sensing data TSD is not received repeatedly or the received sensing data TSD is abnormal sensing data ATSD even after the touch driver TDC is simply initialized, the touch controller TCR may transmit a reset signal RST to the touch driver TDC as in a conventional case.

Here, when the sensing data TSD is not received or the received sensing data TSD is abnormal sensing data ATSD, the touch controller TCR outputs a simplified initialization command a preset number of times (e.g., twice).

Further, when the sensing data TSD is not received or the received sensing data TSD is abnormal sensing data ATSD even after the simplified initialization command is output the preset number of times, the touch controller TCR may be configured to output a reset signal RST.

When the reset signal RST is received from the touch controller TCR, the reset controller RSTC outputs a simplified reset signal SRST to the timing generator TG and the driving sensor DSC. Also, the reset controller RSTC transmits the reset signal RST to the register REG.

That is, when the reset signal RST is received from the touch controller TCR, the reset controller RSTC may initialize not only the timing generator TG and the driving sensor DSC but also the register REG.

In addition, the touch controller TCR may transmit the reset signal RST to the touch driver TDC when the touch driver TDC is initially driven.

This is because it is necessary to receive and store a set value regs from the touch controller TCR since the set value regs is not stored in the register REG at the time of initial driving.

The operations of the timing generator TG and the driving sensor DSC are the same as described in FIG. 6 except that the timing generator TG and the driving sensor DSC receive a simplified reset signal SRST instead of a reset signal RST and thus are not be described in detail herein.

FIG. 11 is a timing diagram illustrating the operation of the touch driver of FIG. 10.

In FIG. 11, first, the controller CONT also activates a touch synchronization signal Tsync to a first level (e.g., low level) and transmits the touch synchronization signal Tsync to the touch controller TCR, the touch driving signal generator TPIC and the touch driver TDC of the touch circuit TC.

The touch controller TCR generates a touch driving generation signal PWM and transmits the generated touch driving generation signal PWM to the touch driving signal generator TPIC and the touch driver TDC.

The touch driving signal generator TPIC generates a touch driving signal TDS on the basis of the touch driving generation signal PWM in a touch period TS according to the touch synchronization signal Tsync and transmits the touch driving signal TDS to the touch driver TDC. The touch driver TDC sequentially supplies the touch driving signal TDS, which is received at a timing designated by the touch driving generation signal PWM, to one or more touch electrodes TE of a plurality of touch electrodes TE and drives the touch electrodes TE.

The touch driver TDC detects a touch sensing signal TSS from the one or more driven touch electrodes TE, converts the detected touch sensing signal TSS into sensing data TSD, and transmits the sensing data TSD to the touch controller TCR.

The touch controller TCR determines whether the sensing data TSD is received at a designated timing and whether the received sensing data TSD is normal.

When it is determined that the received sensing data TSD is normal, the touch controller TCR detects the occurrence of a touch and/or a touch position on the basis of the sensing data TSD.

That is, when the touch driver TDC operates normally, the touch driver TDC of FIG. 10 operates the same as the touch driver TDC of FIG. 6.

However, when it is determined that the sensing data TSD is not received at the designated timing or that the sensing data TSD is received but is abnormal sensing data ATSD, the touch controller TCR toggles the touch driving generation signal PWM a preset number of times while the touch synchronization signal Tsync is inactivated and transmits a simplified initialization command to the touch driver TDC.

When the simplified initialization command is received, the reset controller RSTC of the touch driver TDC outputs a simplified reset signal SRST to the timing generator TG and the driving sensor DSC, thereby initializing the timing generator TG and the driving sensor DSC.

Here, the reset controller RSTC does not transmit the reset signal RST to the register REG. That is, the register REG is not initialized.

Generally, the time to initialize the timing generator TG and the driving sensor DSC is 1 μsec or less, which is much shorter than one touch frame period.

Therefore, the touch driver TDC illustrated in FIG. 10 provides a simplified initialization function of initializing the remaining components other than the register REG, thereby significantly improving the initialization time of the touch driver TDC.

Since simplified initialization time using simplified initialization is much shorter than a touch frame period, even though a malfunction occurs in the touch driver TDC due to EMI or noise, the touch driver TDC can quickly recover and can promptly detect touch again in the next touch frame period. That is, continuous touch input may be recognized, and the continuity of touch input may be maintained.

Therefore, it is possible to prevent a malfunction that may occur due to the inability to recognize a continuous touch input or interruption of a line being drawn.

Figure 12:
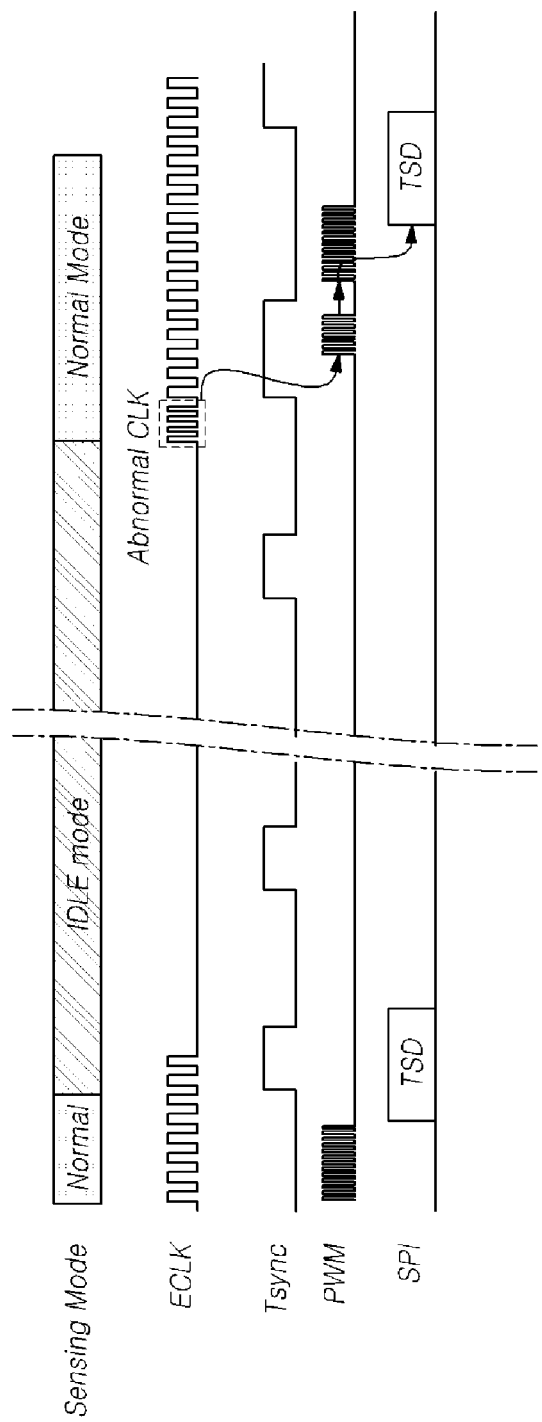
FIG. 12 is a timing diagram illustrating the operation of the touch driver of FIG. 10 in a mode switch.

FIG. 12 is a timing diagram illustrating the operation of the touch driver of FIG. 10 in a mode switch.

The operation of the touch driver in a mode switch illustrated in FIG. 12 is described, compared to FIG. 9. When the touch display device 100 is switched from the idle mode to the normal mode, the touch controller TCR transmits a simplified initialization command to the touch driver TDC, instead of a reset signal RST, after a period in which a clock signal ECLK is stabilized.

As described above, the simplified initialization command is applied to the touch driver TDC by toggling a touch driving generation signal PWM a designated number of times while a touch synchronization signal Tsync is inactivated to a second level (e.g., a high level).

The reset controller RSTC of the touch driver TDC outputs a simplified reset signal SRST to the timing generator TG and the driving sensor DSC according to the simplified initialization command, thereby simply initializing the touch driver TDC.

Simplified initialization initializes the timing generator TG and the driving sensor DSC other than the register REG of the touch driver TDC and thus is performed within a very short time.

Accordingly, the touch driver TDC can immediately sense touch after the mode is switched from the idle mode to the normal mode.

Therefore, user convenience may be improved.

Figure 13:
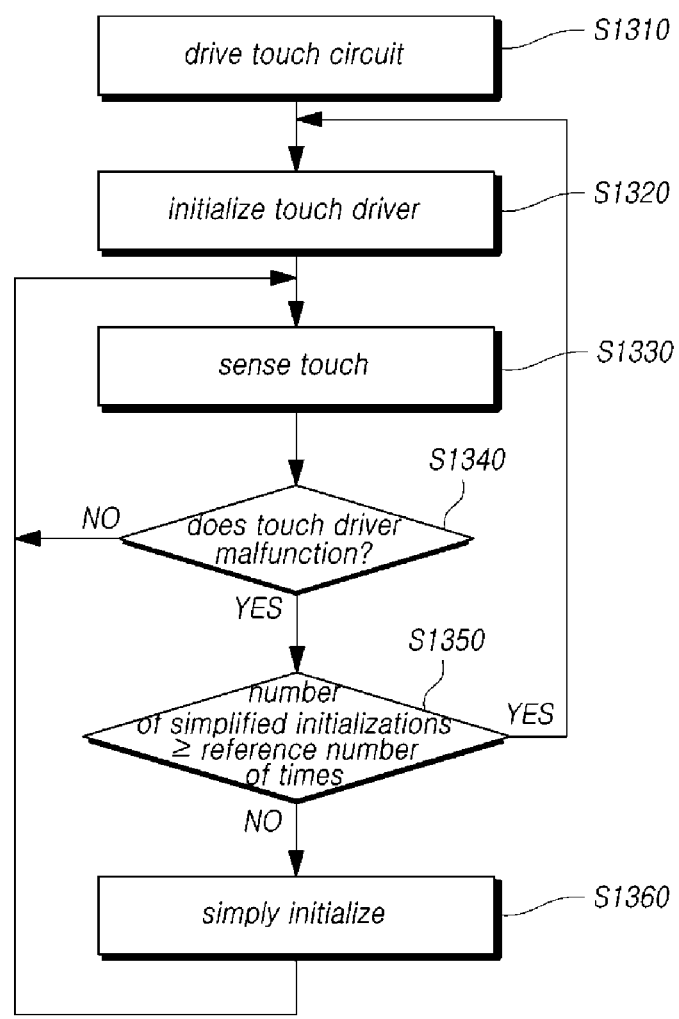
FIGS. 13 and 14 illustrate a method for driving a touch circuit according to aspects of the present disclosure.
Figure 14:
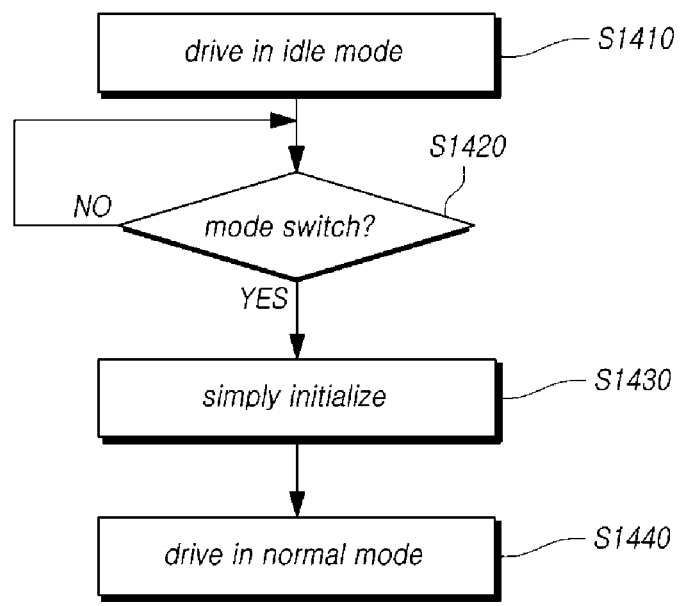

FIGS. 13 and 14 illustrate a method for driving a touch circuit according to aspects of the present disclosure.

FIG. 13 illustrates a method for driving a touch circuit TC that operates in the normal mode, and FIG. 14 illustrates a method for driving a touch circuit TC that operates in the idle mode.

Referring to FIG. 13, the touch circuit TC according to the aspects of the present disclosure is driven when a touch display device 100 is driven (S1310).

A touch controller TCR of the driven touch circuit TC outputs a reset signal RST to a touch driver TDC to initialize the touch driver TDC (S1320).

Upon receiving the reset signal RST, the touch driver TDC communicates with the touch controller TCR to receive a set value regs and stores the received set value regs in a register REG.

The other components of the touch driver TDC are initialized together.

When the touch driver TDC is initialized, the touch circuit TC senses touch on the touch display device 100 (S1330).

Here, the touch controller TCR generates a touch driving generation signal PWM during a touch period TS, in which a touch synchronization signal Tsync transmitted from a controller CONT is activated to a first level, and transmits the touch driving generation signal PWM to a touch driving signal generator TPIC and the touch driver TDC.

The touch driver TDC sequentially supplies a touch driving signal TDS generated by the touch driving signal generator TPIC to one or more of a plurality of touch electrodes TE to drive the touch electrodes TE, detects a touch sensing signal TSS from the one or more driven touch electrodes TE, converts the detected touch sensing signal TSS into sensing data TSD, and transmits the sensing data TSD to the touch controller TCR.

The touch controller TCR detects the occurrence of a touch and/or a touch position on the basis of the sensing data TSD received from the touch driver TDC.

The touch controller TCR analyzes whether the sensing data TSD is received at a designated timing or whether the received sensing data TSD is normal and determines whether the touch driver TDC malfunctions (S1340).

When it is determined that the touch driver TDC malfunctions, the touch controller TCR determines whether the number of times the touch driver TDC is simply initialized is a preset reference number of times or greater.

When the number of times the touch driver TDC is simply initialized is less than the preset reference number of times, the touch controller TCR toggles the touch driving generation signal PWM a preset number of times and outputs the touch driving generation signal PWM to the touch driver TDC while the touch synchronization signal Tsync is inactivated, thereby simply initializing the touch driver TDC (S1360).

Here, when the touch driving generation signal PWM is toggled the preset number of times while the touch synchronization signal Tsync is inactivated, a reset controller RSTC of the touch driver TDC determines that a simplified initialization command is received. Then, the reset controller RSTC outputs a simplified reset signal SRST to a timing generator TG and a driving sensor DSC to initialize the timing generator TG and the driving sensor DSC.

However, when the number of times the touch driver TDC is simply initialized is the preset reference number of times or greater, the touch controller TCR outputs a reset signal RST to the touch driver TDC to initialize the touch driver TDC (S1320).

Consequently, according to the method for driving the touch circuit illustrated in FIG. 13, when the touch driver TDC temporarily malfunctions due to EMI or noise, the touch circuit according to the aspects of the present disclosure may simply initialize the touch driver TDC.

Simplified initialization initializes components other than the register REG of the touch driver TDC and thus may be performed within a very short time. Therefore, initialization time may be significantly improved and the continuity of touch input may be maintained.

That is, it is possible to prevent a malfunction that may occur due to the inability to recognize continuous touch input or interruption of a line being drawn.

In addition, since it is not necessary to add a separate signal line for simplified initialization, simplified initialization may be performed with a minimal structural change to the touch driver TDC.

Referring to FIG. 14, the touch circuit TC according to the aspects of the present disclosure may be driven in the idle mode (S1410). In the idle mode, the touch display device 100 may not generate a clock signal ECLK in order to reduce power consumption.

Thereafter, the touch controller TCR determines whether the touch display device 100 is switched to the normal mode (S1420). When it is determined that the touch display device 100 is switched to the normal mode, the touch controller TCR outputs a simplified initialization command to the touch driver TDC after a preset time for which a clock signal ECLK is stabilized.

As described above, when a touch driving generation signal PWM is toggled a designated number of times while a touch synchronization signal Tsync is inactivated, the touch driver TDC determines that the simplified initialization command is received and performs a simplified initialization operation (S1430).

After simplified initialization of initializing components other than the register REG is performed, the touch driver TDC operates in the normal mode for sensing touch (S1440).

Simplified initialization initializes the timing generator TG and the driving sensor DSC other than the register REG of the touch driver TDC and thus is performed within a very short time.

Therefore, the touch driver TDC can immediately sense touch after the mode is switched from the idle mode to the normal mode.

The above description and the accompanying drawings are merely provided as an example of the technical idea of the present disclosure, and those having ordinary knowledge in the technical field to which the present disclosure pertains will appreciate that various modifications and changes in form, such as combination, separation, substitution, and change of a configuration, may be made to the aspects described herein without departing from the essential features of the present disclosure. Therefore, the aspects disclosed in the present disclosure are intended not to limit but to describe the technical idea of the present disclosure, and thus do not limit the scope of the technical idea of the present disclosure. The scope of the present disclosure should be construed based on the appended claims, and all of the technical ideas included within the scope equivalent to the appended claims should be construed as being included within the scope of the present disclosure.

What is claimed is:

1. A touch display device comprising:
   a touch panel on which a plurality of touch electrodes is disposed; and
   a touch circuit outputting a touch driving signal of a pulse type to the touch panel and to sense occurrence of touch or a touch position according to a touch synchronization signal for defining a touch period for touch sensing, wherein the touch circuit includes a touch driver supplying the touch driving signal to one or more of the plurality of touch electrodes to drive the touch electrodes in the touch period and to obtain sensing data by signal processing of a touch sensing signal detected from the driven touch electrodes, and a touch controller receiving the sensing data to sense occurrence of touch or a touch position and to determine whether the touch driver malfunctions, and outputting a simplified initialization command to the touch driver when the touch driver malfunctions,
   wherein the touch driver is initialized with a pre-stored set value maintained not changed upon receiving the simplified initialization command,
   wherein the touch controller toggles a touch driving generation signal a preset number of times, which is equal to or greater than 2, to output the touch driving generation signal as the simplified initialization command in a period other than the touch period when the touch driver malfunctions.

2. The touch display device of claim 1, wherein the touch controller generates and outputs the touch driving generation signal for generating the touch driving signal in the touch period.

3. The touch display device of claim 2, wherein the touch driver includes:
   a driving sensor receiving the touch driving signal and obtaining the sensing data;
   a timing generator receiving the touch synchronization signal and the touch driving generation signal and controlling timing for the driving sensor to drive a touch electrode according to the set value;
   a register storing the set value for driving the timing generator and the driving sensor; and
   a reset controller outputting a simplified reset signal and initializing the timing generator and the driving sensor upon receiving the simplified initialization command.

4. The touch display device of claim 3, wherein the driving sensor includes:
   a switch receiving the touch driving signal, sequentially selecting the one or more of the plurality of touch electrodes, and supplying the touch driving signal to the one or more touch electrodes;
   a touch sensing signal detector electrically connected to the one or more touch electrodes supplied with the touch driving signal through the switch and detecting the touch sensing signal;
   a sensing data generator converting the touch sensing signal into the sensing data, which is digital data; and
   a communicator transmitting the sensing data to the touch controller, receiving the set value from the touch controller, and transmitting the set value to the register.

5. The touch display device of claim 4, wherein the touch controller outputs a normal reset signal to the touch driver when the touch circuit is driven, and
   the reset controller transmits the normal reset signal to initialize the register and outputs the simplified reset signal to the timing generator and the driving sensor when the normal reset signal is received.

6. The touch display device of claim 5, wherein the register receives and stores the set value from the touch controller through the communicator when the register is initialized.

7. The touch display device of claim 6, wherein the touch controller outputs the normal reset signal to the touch driver when the touch driver malfunctions again after the simplified initialization command is output a preset number of times.

8. The touch display device of claim 3, wherein the touch controller outputs the simplified initialization command to the touch driver after a preset time for which a clock signal is stabilized when the touch display device is switched from an idle mode to a normal mode.

9. The touch display device of claim 2, wherein the touch circuit further comprises a touch driving signal generator receiving the touch driving generation signal from the touch controller in the touch period, generating the touch driving signal according to the touch driving generation signal, and outputting the touch driving signal to the touch driver.

10. The touch display device of claim 1, wherein the set value includes at least one among activated time of a touch synchronization signal, information related to touch driving method, or toggled number of a touch driving generation signal.

11. A touch circuit comprising:
    a touch driver supplying a touch driving signal of a pulse type to one or more of a plurality of touch electrodes disposed on a touch panel to drive the touch electrodes in a touch period, according to a touch synchronization signal for defining the touch period for touch sensing, and obtaining sensing data by signal processing of a touch sensing signal detected from the driven touch electrodes; and
    a touch controller receiving the sensing data to sense occurrence of touch or a touch position and to determine whether the touch driver malfunctions, and to output a simplified initialization command to the touch driver when the touch driver malfunctions,
    wherein the touch controller toggles a touch driving generation signal a preset number of times, which is equal to or greater than 2, to output the touch driving generation signal as the simplified initialization command in a period other than the touch period when the touch driver malfunctions.

12. The touch circuit of claim 11, wherein the touch driver includes:
    a driving sensor receiving the touch driving signal and supplying the touch driving signal to the one or more of the plurality of touch electrodes to thus drive the touch electrodes, and obtaining the sensing data by signal processing of the touch sensing signal detected from the driven touch electrodes;
    a timing generator receiving the touch synchronization signal and a touch driving generation signal and controlling timing for the driving sensor to drive a touch electrode according to a set value;
    a register storing the set value for driving the driving sensor; and
    a reset controller outputting a simplified reset signal and to initialize the timing generator and the driving sensor upon receiving the simplified initialization command.

13. The touch display device of claim 12, wherein the driving sensor includes:
    a switch receiving the touch driving signal, sequentially selecting the one or more of the plurality of touch electrodes, and supplying the touch driving signal to the one or more touch electrodes;

a touch sensing signal detector electrically connected to the one or more touch electrodes supplied with the touch driving signal through the switch and detecting the touch sensing signal;

a sensing data generator converting the touch sensing signal into the sensing data, which is digital data; and a communicator transmitting the sensing data to the touch controller, receiving the set value from the touch controller, and transmitting the set value to the register.

14. The touch display device of claim 13, wherein the touch controller outputs the normal reset signal to the touch driver when the touch circuit is driven, and wherein the reset controller transmits the normal reset signal to initialize the register and outputs the simplified reset signal to the timing generator and the driving sensor when the normal reset signal is received.

15. The touch display device of claim 14, wherein the register receives and stores the set value from the touch controller through the communicator when the register is initialized.

16. The touch display device of claim 15, wherein the touch controller outputs the normal reset signal to the touch driver when the touch driver malfunctions again after the simplified initialization command is output a preset number of times.

17. The touch display device of claim 12, wherein the touch controller outputs the simplified initialization command to the touch driver after a preset time for which a clock signal is stabilized when the touch display device is switched from an idle mode to a normal mode.

18. The touch display device of claim 11, wherein the touch circuit further comprises a touch driving signal generator receiving the touch driving generation signal from the touch controller in the touch period, generating the touch driving signal according to the touch driving generation signal, and outputting the touch driving signal to the touch driver.

19. A method for driving a touch circuit that comprises a touch driver configured to supply a touch driving signal of a pulse type to one or more of a plurality of touch electrodes disposed on a touch panel to drive the touch electrodes in a touch period, according to a touch synchronization signal for defining the touch period for touch sensing, and to obtain sensing data by signal processing of a touch sensing signal detected from the driven touch electrodes; and a touch controller configured to receive the sensing data to sense occurrence of touch or a touch position, the method comprising:

determining, by the touch controller, whether the touch driver malfunctions by analyzing whether the sensing data is received and whether the received sensing data has an abnormal value;

outputting a simplified initialization command to the touch driver when it is determined that the touch driver malfunctions; and initializing, by a reset controller of the touch driver, a timing generator and a driving sensor other than a register that stores a set value for setting a time to operate the touch driver when the simplified initialization command is received, wherein the touch controller toggles a touch driving generation signal a preset number of times, which is equal to or greater than 2, to output the touch driving generation signal as the simplified initialization command in a period other than the touch period when the touch driver malfunctions.

20. A touch driving circuit comprising:

a driving sensor configured to receive a touch driving signal and to supply the touch driving signal to one or more of a plurality of touch electrodes disposed on a touch panel to thus drive the touch electrodes, and to obtain a sensing data by signal processing of a touch sensing signal detected from the driven touch electrodes;

a timing generator configured to receive a touch synchronization signal and a touch driving generation signal and to control timing for the driving sensor to drive a touch electrode according to a set value;

a register configured to store the set value for driving the driving sensor; and a reset controller configured to output a simplified reset signal and to initialize the timing generator and the driving sensor upon receiving a simplified initialization command from an external touch controller, wherein the touch controller toggles a touch driving generation signal a preset number of times, which is equal to or greater than 2, to output the touch driving generation signal as the simplified initialization command in a period other than the touch period when the touch driver malfunctions.

* * * * *